(12) United States Patent
Everhart

(10) Patent No.: US 7,747,866 B1
(45) Date of Patent: Jun. 29, 2010

(54) SYSTEM AND METHOD PROVIDING IMPROVED ERROR DETECTION RELATED TO TRANSMISSION OF DATA OVER A COMMUNICATION LINK

(75) Inventor: Glenn C. Everhart, Smyrna, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 2530 days.

(21) Appl. No.: 09/644,579

(22) Filed: Aug. 24, 2000

(51) Int. Cl.
H04L 9/32 (2006.01)
(52) U.S. Cl. ...................................... 713/181
(58) Field of Classification Search ............ 380/4, 380/21, 23, 25, 49, 202, 28; 705/51; 713/176, 713/181, 151
See application file for complete search history.

(56) References Cited

U.S. PATENT DOCUMENTS

| | | | |
|---|---|---|---|
| 3,896,266 A | 7/1975 | Waterbury | 179/1 |
| 3,938,091 A | 2/1976 | Atalla et al. | 340/149 A |
| 4,321,672 A | 3/1982 | Braun et al. | 364/408 |
| 4,567,359 A | 1/1986 | Lockwood | 235/381 |
| 4,633,397 A | 12/1986 | Macco | 364/406 |
| 4,695,880 A | 9/1987 | Johnson | |
| 4,696,491 A | 9/1987 | Stenger | |
| 4,713,761 A | 12/1987 | Sharpe | |
| 4,725,719 A | 2/1988 | Oncken et al. | 235/487 |
| 4,745,468 A | 5/1988 | Von Kohorn | 358/84 |
| 4,799,156 A | 1/1989 | Shavit et al. | 364/401 |
| 4,823,264 A | 4/1989 | Deming | 364/408 |
| 4,882,675 A | 11/1989 | Nichtberger et al. | 364/401 |
| 4,926,255 A | 5/1990 | Von Kohorn | 358/84 |
| 4,964,043 A | 10/1990 | Galvin | 364/401 |
| 4,992,940 A | 2/1991 | Dworkin | 364/401 |
| 5,016,270 A | 5/1991 | Katz | |
| 5,034,807 A | 7/1991 | Von Kohorn | 358/84 |
| 5,050,207 A | 9/1991 | Hitchcock | 379/96 |
| 5,057,915 A | 10/1991 | Von Kohorn | 463/9 |
| 5,084,816 A | 1/1992 | Boese et al. | 395/575 |
| 5,157,717 A | 10/1992 | Hitchcock | 379/96 |
| 5,220,501 A | 6/1993 | Lawlor et al. | 364/408 |
| 5,233,654 A | 8/1993 | Harvey et al. | 380/20 |
| 5,265,033 A | 11/1993 | Vajk et al. | 364/514 |
| 5,317,683 A | 5/1994 | Hager | |
| 5,321,841 A | 6/1994 | East et al. | 395/725 |

(Continued)

OTHER PUBLICATIONS eCharge, eCharge Corporation, www.echarge.com, Dec. 3, 1999.

(Continued)

*Primary Examiner*—Ellen Tran
(74) *Attorney, Agent, or Firm*—Hunton & Williams LLP

(57) ABSTRACT

The invention detects changes in one or more parameter values sent by a server through user space. In one embodiment, a Web server communicates with a client over the Internet. Before sending the parameter value or values to the client, the server performs a pre-processing step, creating a formatted data string. The server then transmits the formatted data string to the client in a URL or a cookie. When the client returns the formatted data string and other data to the server, the server performs a post-processing step to verify that the parameter value or values have not been tampered with. This round trip technique is a departure from approaches that merely detect tampering of data as it passes between two nodes of a network.

35 Claims, 4 Drawing Sheets

U.S. PATENT DOCUMENTS

| | | | |
|---|---|---|---|
| 5,351,186 A | 9/1994 | Bullock et al. | 364/401 |
| 5,412,708 A | 5/1995 | Katz | |
| 5,420,405 A | 5/1995 | Chasek | 235/379 |
| 5,424,938 A | 6/1995 | Wagner et al. | 364/408 |
| 5,446,740 A | 8/1995 | Yien et al. | 370/110.1 |
| 5,450,134 A | 9/1995 | Legate | 348/467 |
| 5,450,537 A | 9/1995 | Hirai | |
| 5,467,269 A | 11/1995 | Flaten | |
| 5,473,143 A | 12/1995 | Vak et al. | 235/380 |
| 5,473,732 A | 12/1995 | Change | |
| 5,485,370 A | 1/1996 | Moss et al. | 364/408 |
| 5,506,580 A | 4/1996 | Whiting et al. | 341/51 |
| 5,511,117 A | 4/1996 | Zazzera | 379/265 |
| 5,532,920 A | 7/1996 | Hartrick et al. | 364/419.1 |
| 5,537,314 A | 7/1996 | Kanter | 364/406 |
| 5,537,437 A | 7/1996 | Kaku | |
| 5,537,473 A | 7/1996 | Saward | 380/16 |
| 5,544,086 A | 8/1996 | Davis et al. | 364/408 |
| 5,557,334 A | 9/1996 | Legate | 348/473 |
| 5,557,518 A | 9/1996 | Rosen | 364/408 |
| 5,568,489 A | 10/1996 | Yien et al. | 370/110.1 |
| 5,570,465 A | 10/1996 | Tsakanikas | 395/114 |
| 5,590,197 A | 12/1996 | Chen et al. | 380/24 |
| 5,592,560 A | 1/1997 | Deaton | |
| 5,594,837 A | 1/1997 | Noyes | |
| 5,598,557 A | 1/1997 | Doner et al. | 395/605 |
| 5,606,496 A | 2/1997 | D'Agostino | 395/235 |
| 5,621,789 A | 4/1997 | McCalmont et al. | 379/265 |
| 5,621,812 A | 4/1997 | Deaton | |
| 5,625,767 A | 4/1997 | Bartell et al. | 395/140 |
| 5,634,101 A | 5/1997 | Blau | 395/210 |
| 5,638,457 A | 6/1997 | Deaton | |
| 5,644,493 A | 7/1997 | Motai et al. | 364/468 |
| 5,652,786 A | 7/1997 | Rogers | 379/91.01 |
| 5,653,914 A | 8/1997 | Holmes et al. | 252/301.1 |
| 5,657,383 A | 8/1997 | Gerber et al. | 379/266 |
| 5,659,165 A | 8/1997 | Jennings et al. | 235/379 |
| 5,664,115 A | 9/1997 | Fraser | 705/37 |
| 5,675,662 A | 10/1997 | Deaton | |
| 5,684,870 A | 11/1997 | Maloney et al. | 379/212 |
| 5,699,528 A | 12/1997 | Hogan | 395/240 |
| 5,703,344 A | 12/1997 | Bezy et al. | 235/379 |
| 5,710,886 A | 1/1998 | Christensen et al. | 395/214 |
| 5,710,887 A | 1/1998 | Chelliah et al. | 395/226 |
| 5,710,889 A | 1/1998 | Clark et al. | 395/244 |
| 5,715,298 A | 2/1998 | Rogers | 379/91.01 |
| 5,727,163 A | 3/1998 | Bezos | 395/227 |
| 5,734,838 A | 3/1998 | Robinson | |
| 5,740,231 A | 4/1998 | Cohn | |
| 5,754,840 A | 5/1998 | Rivette | |
| 5,758,328 A | 5/1998 | Giovannoli | 705/26 |
| 5,761,647 A | 6/1998 | Boushy | 705/10 |
| 5,761,661 A | 6/1998 | Coussens et al. | 707/9 |
| 5,765,141 A | 6/1998 | Spector | 705/14 |
| 5,774,122 A | 6/1998 | Kojima et al. | 345/355 |
| 5,778,178 A | 7/1998 | Arunachalam | 395/200.33 |
| 5,784,562 A | 7/1998 | Diener | |
| 5,787,403 A | 7/1998 | Randle | 705/43 |
| 5,790,650 A | 8/1998 | Dunn et al. | 379/265 |
| 5,790,785 A | 8/1998 | Klug | |
| 5,793,861 A | 8/1998 | Haigh | 379/266 |
| 5,794,207 A | 8/1998 | Walker et al. | 705/23 |
| 5,794,221 A | 8/1998 | Egendorf | 705/40 |
| 5,794,259 A | 8/1998 | Kikinis | |
| 5,796,395 A | 8/1998 | De Hond | |
| 5,802,498 A | 9/1998 | Comesanas | 705/34 |
| 5,802,502 A | 9/1998 | Gell et al. | 705/37 |
| 5,815,657 A | 9/1998 | Williams | |
| 5,815,683 A | 9/1998 | Vogler | 395/500 |
| 5,819,092 A | 10/1998 | Ferguson et al. | 395/701 |
| 5,819,285 A | 10/1998 | Damico et al. | 707/104 |
| 5,825,870 A | 10/1998 | Miloslavsky | 379/265 |
| 5,826,241 A | 10/1998 | Stein et al. | 705/26 |
| 5,826,245 A | 10/1998 | Sandberg-Diment | 705/44 |
| 5,826,250 A | 10/1998 | Trefler | 706/50 |
| 5,832,460 A | 11/1998 | Bednar et al. | 705/27 |
| 5,832,476 A | 11/1998 | Tada et al. | 707/2 |
| 5,835,580 A | 11/1998 | Fraser | 379/115 |
| 5,838,906 A | 11/1998 | Doyle et al. | 395/200.32 |
| 5,842,178 A | 11/1998 | Giovannoli | 705/26 |
| 5,842,211 A | 11/1998 | Horadan et al. | 707/10 |
| 5,844,553 A | 12/1998 | Hao et al. | 345/329 |
| 5,845,259 A | 12/1998 | West et al. | 705/14 |
| 5,845,260 A | 12/1998 | Nakano | |
| 5,847,709 A | 12/1998 | Card et al. | 345/355 |
| 5,848,427 A | 12/1998 | Hyodo | 707/513 |
| 5,862,223 A | 1/1999 | Walker et al. | 380/25 |
| 5,864,830 A | 1/1999 | Armetta et al. | 705/41 |
| 5,870,456 A | 2/1999 | Rogers | 379/91.01 |
| 5,870,718 A | 2/1999 | Spector | 705/26 |
| 5,870,724 A | 2/1999 | Lawlor et al. | 705/42 |
| 5,872,848 A * | 2/1999 | Romney et al. | 713/176 |
| 5,873,072 A | 2/1999 | Kight et al. | 705/40 |
| 5,880,769 A | 3/1999 | Nemirofsky et al. | 348/12 |
| 5,884,032 A | 3/1999 | Bateman et al. | 395/200.34 |
| 5,884,288 A | 3/1999 | Chang et al. | 705/40 |
| 5,889,863 A | 3/1999 | Weber | 380/25 |
| 5,892,900 A | 4/1999 | Ginter | |
| 5,892,904 A * | 4/1999 | Atkinson et al. | 713/201 |
| 5,898,780 A | 4/1999 | Liu | |
| 5,899,982 A | 5/1999 | Randle | 705/35 |
| 5,903,881 A | 5/1999 | Schrader et al. | 705/42 |
| 5,914,472 A | 6/1999 | Foladare | |
| 5,915,244 A | 6/1999 | Jack | |
| 5,918,214 A | 6/1999 | Perkowski | 705/27 |
| 5,918,217 A | 6/1999 | Maggioncalda et al. | 705/36 |
| 5,918,239 A | 6/1999 | Allen | |
| 5,920,847 A | 7/1999 | Kolling et al. | 705/40 |
| 5,926,812 A | 7/1999 | Hilsenrath et al. | 707/5 |
| 5,933,816 A | 8/1999 | Zeanah et al. | 705/35 |
| 5,933,817 A | 8/1999 | Hucal | |
| 5,933,823 A | 8/1999 | Cullen et al. | 707/6 |
| 5,933,827 A | 8/1999 | Cole et al. | 707/10 |
| 5,940,812 A | 8/1999 | Tengel et al. | 705/38 |
| 5,943,656 A | 8/1999 | Crooks et al. | 705/30 |
| 5,950,173 A | 9/1999 | Perkowski | 705/26 |
| 5,952,641 A | 9/1999 | Korshun | 235/382 |
| 5,953,710 A | 9/1999 | Fleming | |
| 5,958,007 A | 9/1999 | Lee | |
| 5,960,411 A | 9/1999 | Hartman | |
| 5,963,952 A | 10/1999 | Smith | |
| 5,963,953 A | 10/1999 | Cram et al. | 707/102 |
| 5,969,318 A | 10/1999 | Mackenthun | |
| 5,970,482 A | 10/1999 | Pham | |
| 5,970,483 A | 10/1999 | Evans | 707/3 |
| 5,982,370 A | 11/1999 | Kamper | 345/356 |
| 5,991,751 A | 11/1999 | Rivette | |
| 5,991,780 A | 11/1999 | Rivette et al. | 707/512 |
| 5,995,948 A | 11/1999 | Whitford et al. | 705/41 |
| 5,999,907 A | 12/1999 | Donner | |
| 6,005,939 A | 12/1999 | Fortenberry | |
| 6,012,088 A | 1/2000 | Li | |
| 6,014,636 A | 1/2000 | Reeder | |
| 6,014,638 A | 1/2000 | Burge | |
| 6,018,714 A | 1/2000 | Risen | |
| 6,026,429 A | 2/2000 | Jones | |
| 6,032,147 A | 2/2000 | Williams | |
| 6,049,835 A | 4/2000 | Gagnon | |
| 6,055,637 A | 4/2000 | Hudson | |
| 6,061,665 A | 5/2000 | Bahreman | |
| 6,064,987 A | 5/2000 | Walker | |
| 6,081,810 A | 6/2000 | Rosenzweig | |
| 6,088,683 A | 7/2000 | Jalili | |
| 6,088,700 A | 7/2000 | Larsen | |

| | | | |
|---|---|---|---|
| 6,098,070 A | | 8/2000 | Maxwell |
| 6,105,012 A | * | 8/2000 | Chang et al. ............... 705/64 |
| 6,112,181 A | | 8/2000 | Shear |
| 6,131,810 A | | 10/2000 | Weiss |
| 6,134,549 A | | 10/2000 | Regnier |
| 6,144,948 A | | 11/2000 | Walker |
| 6,148,293 A | | 11/2000 | King |
| 6,170,011 B1 | | 1/2001 | Macleod Beck |
| 6,185,242 B1 | | 2/2001 | Arthur |
| 6,189,029 B1 | | 2/2001 | Fuerst |
| 6,195,644 B1 | | 2/2001 | Bowie |
| 6,201,948 B1 | | 3/2001 | Cook |
| 6,298,330 B1 | * | 10/2001 | Gardenswartz et al. ....... 705/14 |
| 6,389,537 B1 | * | 5/2002 | Davis et al. ............... 713/187 |
| 6,499,105 B1 | * | 12/2002 | Yoshiura et al. ............ 713/176 |
| 6,820,202 B1 | * | 11/2004 | Wheeler et al. ............ 713/185 |
| 2001/0054003 A1 | | 12/2001 | Chien |
| 2002/0010599 A1 | | 1/2002 | Levison |

OTHER PUBLICATIONS

Tracy Pletz et al., Summary of the at your risk architecture, Jun. 3, 1999.
Siebel, Siebel: Ensuring Customer Success, www.siebel.com, Nov. 17, 1999.
OMG, Welcome to OMG's CORBA for Beginners Page!, www.omg.com, May 25, 1999.
Sun MicroSystems, Inc., Schema for Representing CORBA Objects in an LDAP directory, May 21, 1999.
OMG, Library, www.omg.com, May 25, 1999.
OMG, What is CORBA?, www.omg.com, May 25, 1999.
Overview of CORBA, www.omg.com, May 25, 1999.
JAVA, JAVA™ Technology in the Real World, java.sun.com, May 21, 1999.
JAVA, JAVA™ Servlet API, java.sun.com, May 21, 1999.
JAVA, Staying in Touch with JNDI, java.sun.com, May 21, 1999.
JAVA, JAVA™ Remote Method Invocation (RMI) Interface, java.sun.com, May 21, 1999.
JAVA, Banking on JAVA™ Technology, java.sun.com, May 21, 1999.
JAVA, The JDBC™ Data Access API, java.sun.com, May 21, 1999.
Anne Thomas, Enterprise JAVABEANS™ Technology: Server Component Model for the Java™ platform, java.sun.com, May 21, 1999.
S. R. Hiremath, Numerical Credit Scoring Model, Operations Research Bulletin, WA13.16, Apr. 30, 1975.
Reuters, Getting Smart with Java: Sun Micro Says American Express to Use Java for Smart Card, www.abcnew.go.com/sciences/tech, Jun. 6, 2000.
David Bank, Cash, Check, Charge—What's Next?, Seattle Times, Mar. 6, 1998.
Gerry Vandenengel, Cardson the Internet: Advertising on a $3 Bill, Industry Intelligence, Feb. 1, 1995.
Kim A. Strassel, Dutch Software Concern Experiments with Electronic 'Cash' in Cyberspace, Wall Street Journal, Apr. 17, 1995.
Jeffrey Kutler, Cash Card Creator Looking Beyond Mondex, Feb. 9, 1995.
David Post, E-Cash: Can't Live With It, Can't Live Without It, The American Lawyer, pp. 116-117, Mar. 1, 1996.
Russell Mitchell, Cyberspace: Crafting Software . . . , Business Week, pp. 78-86, Feb. 27, 1995.
Jeffrey Kutler, A Different Drummer on the Data Highway, American Banker, May 12, 1995.
Stephen Eppmt, A pLayer Goes After Big Bucks in Cyberspace, American Banker, May 5, 1995.
Robert Barnham, Network Brings Together Producers and Companies, Bests Review Feb. 1, 1994.
Vanessa Houlder, OFT Gives the Individual Top Priority: Report Calls for Deregulation of Business Lending, The Financial Times, Jun. 8, 1994.
Kennedy Maiz, Fannie Mae on the Web, Newsbyte, May 8, 1995.
Anne Knowles, Improved Internet Security Enabling On-Line Commerce, PC Week, Mar. 20, 1995.

Aversion Therapy: Banks Overcoming Fear of the Net to Develop Safe Internet-based Payment System w/ Netscape Communicator, Network World, Dec. 12, 1994.
Don Clark, Microsoft, Visa to Jointly Develop PC Electronic-Shopping Software, Wall Street Journal, The, B9, Nov. 9, 1994.
Understanding Product Data Management, Hewlett-Packard Company, Apr. 26, 1999.
Getting Started: Specific GE TPN Post Service Use Guidelines, GE, Apr. 26, 1999.
Resource Center: Consolidated Edison Selects GE TPN Post, GE, Apr. 26, 1999.
ThomasNet, Thomas Publishing Company, Apr. 26, 1999.
SoluSource: For Engineers by Engineers, Thomas Publishing Company, Apr. 26, 1999.
Harris InfoSource, Apr. 26, 1999.
Welcome to MUSE, MUSE Technologies, Apr. 26, 1999.
Product Data Integration Technologies, Inc., PDIT, Apr. 26, 1999.
SBA: Pro-Net, SBA, Apr. 1, 1999.
FreeMarkets, FreeMarkets Online, Inc., Apr. 26, 1999.
Associates National Bank (DE) Credit Card Services, The Associates, www.theassocitheassociates.atescomcorn/consumer/credit_cards/rnain.html, Apr. 6, 1999.
At Your Request, Wingspanbankcom, Sep. 28, 1999.
Robyn Meredith, Internet bank moves closer to virtual reality, USA Today, May 5, 1995.
Marvin Sirbu and J.D. Tygar, NetBill: An Internet Commerce System Optimized for Network Delivered Services, http://www.ini.cmu.edu:80/netbill, pp. 1-12, Feb. 27, 1995.
The check is in the email., Information Today, vol. 12, No. 3, Mar. 1, 1995, ISSN: 8755-6286.
The Gale Group, G&D America's Multi-application Smart Card Selected for Combined Payroll and 'Virtual Banking' Program in Mexico, wysiwyg://0/http://www.dialogclassic.com/history, Business Wire, Apr. 24, 1998, p4241047.
Richard Mitchell, Netlink Goes After An Unbanked Niche, wysiwyg://0/http://www.dialogclassic.com/history, ISSN: 1093-1279, Sep. 1999.
"Aversion therapy: Banks overcoming fear of the 'Net To develop safe Internet-based payment system w/Netscape Commun.," Network Word, Dec. 12, 1994, p. 1.
"Cards on the Internet—Advertising on a $3 Bill," Industry Intelligence, by Gerry Vandenengel, pp. 46-48.
"Cash Card Creator Looking Beyond Mondex," Feb. 9, 1995, by Jeffrey Kutler, 1 page.
"Cash, check, charge—what's next?," published on Mar. 6, 1995 in the Seattle Times, by David Bank, 4 pages.
"The check is in the E-mail (online payment system for the Internet from Information Sciences Institute of the University of Southern California)," Information Today, vol. 12, No. 3, Mar. 1, 1995, pp. 1-4.
"But conflicting schemes leave marketers on sidelines for now," Advertising Age, Dec. 19, 1994, by Curtis Lang, pp. 1-5.
"Cyberspace—Crafting software that will let you build a business out there," Business Week, Feb. 27, 1995.
"E-Cash: Cant' Live With It, Can't Live Without It," The American Lawyer, Mar. 1995, by David Post, pp. 116-117.
"eCharge" website @ http://www.echarge.com, eCharge Corporation, including sections 1—Corporate; 2—Products; 3—News; 4—Partners; and 5—Careers, Feb. 18, 2000.
FreeMarkets® Web Applications Informational Brochure, including the following sections: 1-Buyers Saving Money; 2-Suppliers Growing Sales; 3-About FreeMarkets; 4-Career Opportunities; 5-Contacts; 6-What's New; and 7-Index , 1999, 34 pages.
"Getting Smart With Java—Sun Micro Says American Express to Use Java for Smart Card," ABCNEWS.com website, Reuters, San Francisco, Jun. 6, 2000, 2 pages.
"Getting Started—Specific GE TPN Post Service Use Guidelines" GE TPN Post Service Use Guidelines website, Apr. 26, 1999, 18 pages.
"Resource Center—Consolidated Edison Selects GE TPN Post," GE TPN Post Resource Center website, Apr. 26, 1999, 9 pages.
"How the RMA/Fair, Issac credit-scoring model was built," Journal of Commercial Lending, vol. 77, No. 10, Jun. 1995, by Latimer Asch, 5 pages.

"Improved Internet security enabling on-line commerce (new services based on Secure Hypertext Transfer Protocol, Secure Sockets Layer standards)," PC Week, vol. 12, No. 11, Mar. 20, 1995, by Anne Knowles, 4 pages.

"Microsoft, Visa to Jointly Develop PC Electronic-Shopping Software," The Wall Street Journal, Nov. 9, 1994, Technology section, by Don Clark, 3 pages.

"Network brings together producers and companies," Alberta Cividanes, Feb. 1, 1994, by Robert Barnham, 1 page.

"NetBill: An Internet Commerce System Optimized for Network Delivered Services," Carnegie Mellon University, by Marvin Sirbu et al., Feb. 27, 1995, 11 pages.

"A Player Goes After Big Bucks in Cyberspace," American Banker, May 5, 1995, by Stephen Eppmt, 1 page.

"Product Data Integration Technologies, Inc.," website including section 1—The Company; 2—Services; 3—Products; 4—Communications Center; 5—Career Center; 6—New on the Site; and 7—Search our Site, Apr. 26, 1999, 19 pages.

"SBA/Pro-Net," U.S. Small Business Administration Procurement Marketing and Access Network website, earliest date of Sep. 27, 1997, 11 pages.

"Siebel," website @ www.siebel.com including sections 1—Home; 2—About Siebel; 3—Products and Solutions; 4—Worldwide Services; 5—News & Events; 6—Siebel Customers; 7—Education; 8—Careers; 9—Alliances; and 10—Siebel Worldwide, Nov. 17, 1999, 29 pages.

"ThomasNet," website @ www.thomasnet.com, including sections 1—Electronic Services; 2—SoluSource; and 3—Technical Services, Apr. 26, 1999, 9 pages.

"Visa & Carnegie Mellon Plan Online Payment Scheme," Newsbytes News Network, Feb. 15, 1995, 2 pages.

"MUSE Technologies," website, including sections 1—Muse; 2—Muse Applied; 3—Products; 4—In the News; 5—Employment; 6—Insight; and 7—Request Additional Information, Apr. 26, 1999, 28 pages.

"Two Way String-Matching"; M. Crochemore, et al.; L.I.T.P., Institut Blaise Pascal, Université Paris 7, 2, Place Jussieu, Paris Cedex 05, France; Journal of the Association for Computing Machinery; vol. 38, No. 3; Jul. 1991; pp. 651-675.

"Cryptographic Algorithms" website: www.mach5.com/crypto/algorithms.html; printed Apr. 7, 2000; pp. 1-8.

"Concepts of Cryptography"; website: www.mach5.com/cryto/concepts.html; printed Apr. 17, 2000; pp. 1-2.

"Cryptography FAQs"; website: www.thawte.com/support/crypto/hash.html; printed Apr. 17, 2000; pp. 1-2.

"IP Authentication using Keyed SHA1 with Data Padding"; Internet Draft; P. Metzger, et al; Apr. 1996; pp. 1-6.

"Introduction to Public-Key Cryptography"; website: www.developer.netscape.com/docs/manuals/security/pkin/contents.htm.; pp. 1-19.

"Introduction to SSL"; website: www//developer.netscape.com/docs/manuals/security/sslin/contents.htm; printed Feb. 29, 2000; pp. 1-11.

"8.1 URLs for HTTP Servers"; website: www//utoronto.ca/webdocs/HTMLdocs/NewHTML/url_http.html; printed Jul. 26, 2000; pp. 1-2.

"Uniform Resource Locators"; www.w3.org./Addressing/URL/url-spec.html; printed Feb. 29, 2000; pp. 1-15.

"Understanding Malicious Content Mitigation for Web Developers"; website: www.cert.org/tech_tips/malicious_code_mitigation.html; printed Feb. 29, 2000; pp. 1-10.

FedCIRC Advisory FA-2000-02 Malicious "HTML Tags Embedded in Client Web Requests"; www2.fedcirc.gov/advisori3es/FA-2000-02.html.

"Frequently Asked Questions About Malicious Web Scripts Redirected by Web Sites"; CERT® Coordination Center website: www.cert.org/tech_tips/malicious_code_FAQ.html; pp. 1-5.

"Information on Cross-Site Scripting Security Vulnerability"; website: www.microsoft.com/technet/security/crssite.asp; printed Feb. 29, 2000; pp. 1-2.

"Cross-Site Scripting Security Exposure Executive Summary"; website: www.microsoft.com/technet/security/ExSumCS.asp; printed Feb. 29, 2000; pp. 1-4.

"Cross-Site Scripting: Frequently Asked Questions"; website: www.microsoft.com/technet/security/crsstFAQ.asp; printed Feb. 29, 2000, pp. 1-5.

"HOWTO: Prevent Cross-Site Scripting Security Issues"; website: www.support.microsoft.com/support/kb/articles/q252/9/85.asp?FR=1; printed Feb. 29, 2000; pp. 1-4.

"Cross-site Scripting Overview"; www.microsoft.com/technet/security/CSOvery.asp; printed Feb. 29, 2000; pp. 1-16.

"Hackers tampering with Internet, e-mail links"; D. Frank; www.fcw.com/few/articles/2000/0131/web-hackers 02-04-00.asp; written Feb. 4, 2000; printed Feb. 28, 2000; pp. 1-2.

* cited by examiner

<A HREF="http://widget.sales.com/cgi-bin/order_entry?100+14+73+1" order qty 1 </A>
<A HREF="http://widget.sales.com/cgi-bin/order_entry?100+14+73+2" order qty 2 </A>
<A HREF="http://widget.sales.com/cgi-bin/order_entry?100+14+73+3" order qty 3 </A>

400   410         420

FIG. 4-A cgi-bin/order_entry?&price=100&sessid=14&hash=73&qty=1

420

FIG. 4-B order qty 1
order qty 2
order qty 3

FIG. 4-C

<A HREF="http://widget.sales.com/cgi-bin/order_entry?1+14+73+1" order qty 1 </A>

SYSTEM AND METHOD PROVIDING IMPROVED ERROR DETECTION RELATED TO TRANSMISSION OF DATA OVER A COMMUNICATION LINK

FIELD OF THE INVENTION

The invention relates generally to computers and digital processing systems, and more specifically to a system and method providing improved error detection related to transmission of data over a communications link.

BACKGROUND OF THE INVENTION

The development and expanded use of the Internet in recent decades has provided both opportunities and risks for users. The same network that enables improved communication, access to information, and more affordable marketing presence is not without hazards. Generally speaking, those hazards include the theft of information, corruption or destruction of information, breach of confidential information, and intentional denial of service.

This invention addresses the risk of data corruption where a server sends parameters out to a user space and expects to receive the same values in a subsequent communication. As an example, consider a Web site that is hosted on a server and is accessible by any number of client users. For purposes here, a client, user, or client user refers to either a computer workstation configured with a Web browser or the user of such a browser, as appropriate. Where the client is doing more than just reading information posted on the Web site, there may be a two-way exchange of data between the Web server and the client. A common implementation of electronic commerce, for instance, is where a Web site contains products that a user can purchase on-line for a specified price. Such a presentation may reasonably be interpreted as an offer for the sale of goods in the contractual sense: it provides terms that can be accepted by a buyer without subsequent action by the seller. Suppose the Uniform Resource Locator (URL) contains not only the location of the Web page, but also a hidden pricing parameter for a product contained on the Web page. There is a risk that, even though hidden, a user might tamper with the value of the price parameter (most likely changing it to a lower value) prior to placing an on-line order. If the transaction is automatically processed using the changed parameter, then the user's alteration could result in economic harm to the seller.

Unfortunately, it is very difficult to detect or prevent this type of tampering. Security measures that restrict users, for example by employing a firewall, provide little utility since the nature of Web-based e-commerce is that new and previously unknown users must have easy access in order to transact business with the Web server. Moreover, encryption, hashing, and other techniques known in the art designed to detect tampering or to secure data as it passes between point A and point B (between a server and client, in this case) are not adapted to detect tampering of data while it resides at point B.

Thus, server applications that pass parameters through user space, and operate on the assumption that the value of one or more parameters will not be changed by a user, are exposed to a vulnerability not effectively managed by known security measures. This and other drawbacks and limitations exist in known approaches to error detection.

SUMMARY OF THE INVENTION

The invention overcoming these and other drawbacks in the art relates to a system and method that provides an improved technique for error detection related to the transmission of data over a network.

It is an object of the invention to mitigate the risk to server applications where parameter values are passed through a user space.

It is another object of the invention to provide the added security with minimal impact on the speed at which a server application can be executed.

It is another object of the invention to not unduly restrict access to server-based applications by remote users.

In one embodiment of the invention, a Web server communicates with a client over the Internet. The client may be configured with a Web browser allowing access to an application that resides on the Web server. The server application may require that a parameter value be passed to the client in a URL, then returned to the server in a subsequent communication. Before sending the parameter value to the client, the server may perform a pre-processing step, resulting in a formatted data string. The server may then transmit the formatted data string to the client. After the client returns the formatted data string and other data to the server, the server may perform a post-processing step to verify that the parameter value or values have not been tampered with. Thus, the pre-processing and post-processing steps operate together to detect whether parameters that pass through a user space have been tampered with. This is a departure from techniques that merely detect tampering of data as it passes between two nodes of a network.

The following drawings and descriptions further describe the invention, including several different embodiments of the major system components and processes. The construction of such a system, implementation of such a process, and advantages will be clear to a person skilled in the art of error detection in communication systems.

BRIEF DESCRIPTION OF THE DRAWINGS

FIGS. 4-A through 4-D are examples of Web-based code and screen displays that may be used to pass parameter values between a client and a server, according to one embodiment of the invention.

DETAILED DESCRIPTION OF THE INVENTION

Figure 1:
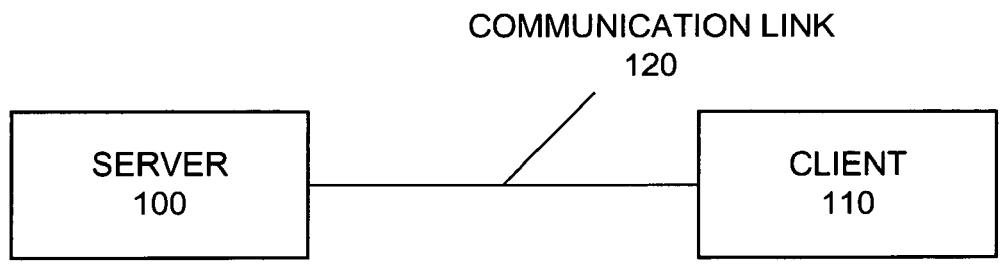
FIG. 1 is the schematic diagram of a system configured to detect errors associated with tampering of parameters in a user space, according to one embodiment of the invention.

The invention relates to a data security risk that arises when an application on a server passes parameter values through user space. FIG. 1 provides a schematic illustration of such a configuration: where a server 100 is connected to a client 110 via a communication link 120. Other embodiments may include multiple servers or clients.

Server 100 is configured to provide certain pre-processing and post-processing functions that enable detection of changes in parameter values that originate at server 100, are transmitted to client 110, and are subsequently returned to server 100. Server 100 may be or include, for instance, a workstation running the Microsoft Windows™ NT™, Windows™ 2000, Unix, Linux, Xenix, IBM AIX, Hewlett-Packard UX, Novell Netware™, Sun Microsystems Solaris™, OS/2™, BeOS™, Mach, Apache, OpenStep™ or other operating system or platform.

Client 110 may be a user workstation that may allow for remote access to applications that reside on server 100. Client 110 may also run its own applications, and may exchange data with server 100. Client 110 may be or include, for instance, a personal computer running the Microsoft Windows™ 95, 98, Millenium™, NT™, or 2000, Windows™CE™, PalmOS™, Unix, Linux, Solaris™, OS/2™, BeOS™, MacOS™ or other operating system or platform. Client 110 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. Client 110 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art. Client 110 may also be or include a network-enabled appliance such as a WebTV™ unit, radio-enabled Palm™ Pilot or similar unit, a set-top box, a networkable game-playing console such as Sony Playstation™ or Sega Dreamcast™, a browser-equipped cellular telephone, or other TCP/IP client or other device. It should be appreciated that in other embodiments, there may be multiple clients that have access to any given server.

Communication link 120 connects server 100 to client 110. Communications link 120 may be, include or interface to any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDI (Fiber Distributed Data Interface) or CDDI (Copper Distributed Data Interface) connections. Communications link 120 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 120 may yet further be, include or interface to any one or more of an RS-232 serial connection, an IEEE-1394 (Firewire) connection, a Fibre Channel connection, an IrDA (infrared) port, a SCSI (Small Computer Serial Interface) connection, a USB (Universal Serial Bus) connection or other wired or wireless, digital or analog interface or connection.

Server 100 and client 110 may utilize networked enabled code related to communication link 120. Network enabled code may be, include or interface to, for example, Hyper Text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Java™, Jini™, C, C++, Perl, UNIX Shell, Visual Basic or Visual Basic Script, Virtual Reality Markup Language (VRML) or other compilers, assemblers, interpreters or other computer languages or platforms.

Figure 2:
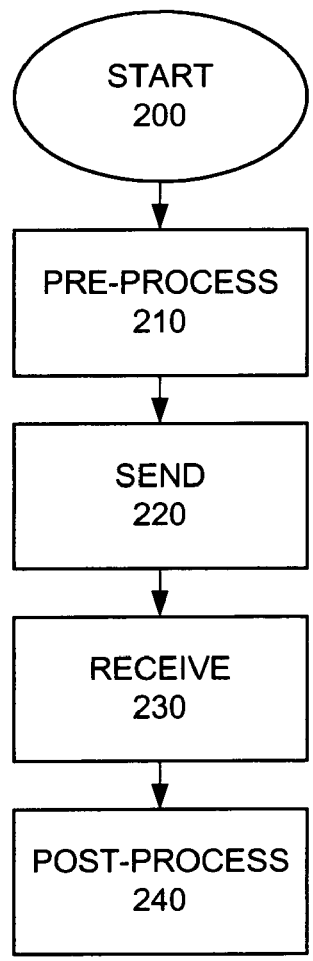
FIG. 2 is a flow diagram illustrating a method for detecting errors associated with tampering of parameters in a user space, according to one embodiment of the invention.

FIG. 2 is an overview of a method used to detect the class of errors targeted by the invention. The process may start in step 200 when, for instance, an application on server 100 determines that one or more parameter values will be sent to client 110, and when those parameter values are expected to be returned to server 100 for a subsequent operation. An example may be where server 100 is sending the price of goods to client 110 and where server 100 expects to receive that same price in return as an input to an automated order entry system. Generally speaking, server 100 may execute pre-processing step 210 on parameter values such as price in order to form a basis for comparison in post-processing step 240 after those same parameter values have been sent to and received from client 110 in steps 220 and 230, respectively.

Figure 3:
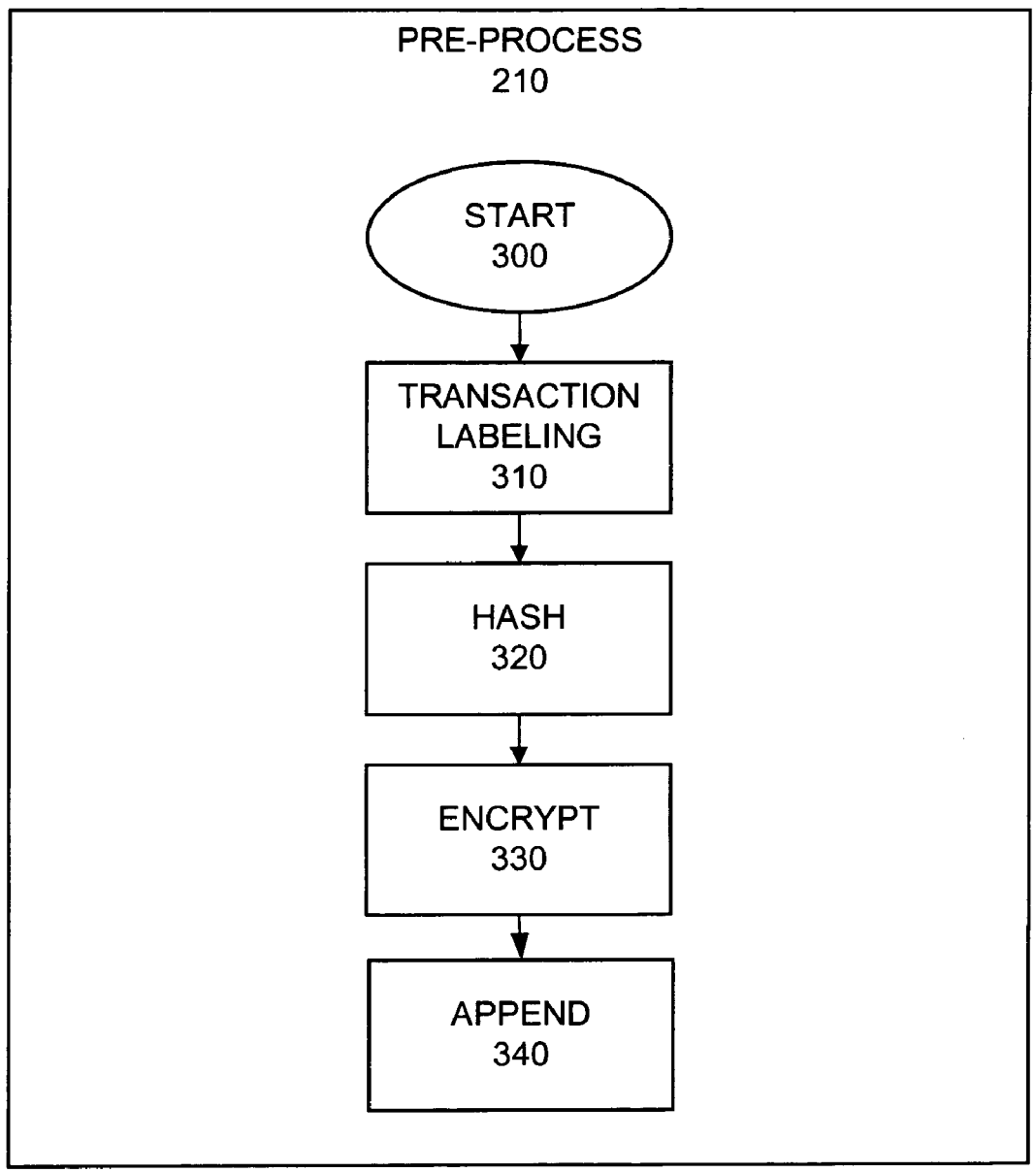
FIG. 3 is a flow diagram detailing a pre-processing step, according to one embodiment of the invention.

FIG. 3 illustrates several steps that may be executed once pre-processing step 210 is initiated in step 300. In step 310, a transaction label may be assigned to the pre-processing transaction. In one embodiment, step 310 may involve the assignment of a session identification number. In another embodiment, step 310 may perform date and time stamping. Other similar methods for labeling a transaction may be familiar to those skilled in the art. Pre-processing step 210 may further include a hashing step 320 which operates on one or more parameter values to produce one or more resultant numbers. Hashing step 320 may also operate on one or more transaction labels. An embodiment of hashing step 320 may therefore be, or utilize, one or more hashing algorithms, such as MD2, MD4, MD5, RIPEMD, RIPEMD-160, SHA1, Snefru, or Tiger, for example. Hashing step 320 may operate on one or more parameter values or transaction labels resulting in a single number. In another embodiment, hashing step 320 may operate on each of several parameter values and transaction labels separately, resulting in a series of hashes. In step 330, the results of transaction labeling step 310 and hashing step 320 may be encrypted. In another embodiment, only the results from step 310 or 320 may be encrypted. In yet another embodiment, the results of steps 310 and 320 may not be encrypted at all. Where used, encryption step 330 may employ an algorithm known only to the server: a private key, for instance. Pre-processing step 210 may complete once encrypted values of the transaction label and hash are appended to the parameter values, as depicted in FIG. 3 by step 340, to create a formatted data string that is ready to be sent into user space.

Send step 220 and receive step 230 may function by passing data strings in a Uniform Resource Locator (URL), in a cookie, or by other techniques known in the art. FIG. 4-A depicts how server 100 may send data to client 110 by embedding a URL into a dynamically-generated Web page, according to one embodiment of the invention. In this example, the embedded URL specifies a Hyper-Text Transfer Protocol (HTTP) server in field 400 and a host computer location called widget.sales.com in field 410. Field 420 is the path, where the /cgi-bin/ string makes special reference to a program called order entry that will execute on server 100 using parameter values 100, 14, 73 and 1, or using 100, 14, 73 and 2, or using 100, 14, 73 and 3, depending upon the link selected by the client user. The parameter values in field 420 may represent, for example, a unit price of 100, a session identification number of 14, and a hash of 73, resulting from pre-processing step 210. The final parameter value may represent a quantity of goods: 1, 2, or 3. In another embodiment, the parameter values in field 420 may be expressed using parameter labels &price, &sessid, &hash, and &qty, as depicted in FIG. 4-B. Other labels and other formats may also be used to pass data, in accordance with various communication protocols.

FIG. 4-C illustrates what the browser of client 110 might display, according to the HyperText Markup Language (HTML) code in FIG. 4-A.

Notwithstanding the fact that parameter values in this instance are hidden, a client user may seek to tamper with the values contained in the URL, for example by decreasing the unit price parameter from a value of 100 to a value of 1. Such a change is depicted in FIG. 4-D. If a client selects the modified link of FIG. 4-D, the changed price value in field 430 may be sent to server 100 for automatic order entry at the reduced price.

Figure 5:
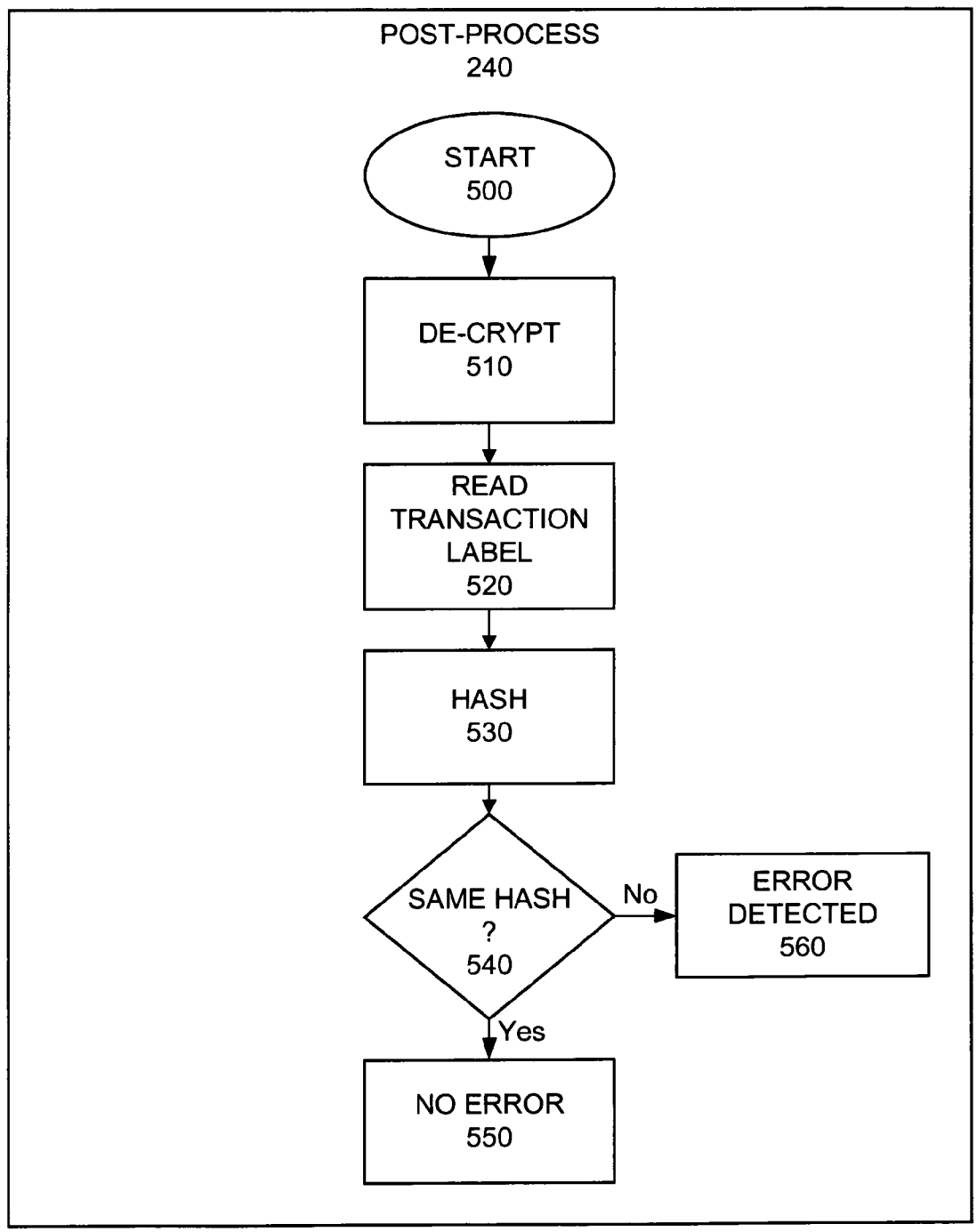
FIG. 5 is a flow diagram detailing a post-processing step, according to one embodiment of the invention.

FIG. 5 provides one embodiment of post-processing step 240 that may be executed on server 100 in order to detect whether a parameter value, such as price in the example above, has been changed. The process may begin, in step 500, after data has been received from client 110. In step 510, all values that were encrypted, the session identification number and hash for example, may be decrypted. Step 510 may employ a private key known only to server 100. In step 520, server 100 may read the transaction label, which may be a session identification number, date and time stamp, or other identifier. A new hash may be performed on one or more parameter values in step 530. Hashing in step 530 may operate on all parameter values at once, or it may operate separately on each of several parameter values. It may be necessary for hashing step 530 to operate in identical fashion as hashing step 320. Using the transaction label as an index, the hash or hashes resulting from step 530 may be compared in step 540 to the hash or hashes that resulted from step 320. If the hash or hashes are the same, then it may be concluded in step 550 that no errors have been detected. If, on the other hand, one or more hash values are not the same, then step 560 may indicate that an error has been detected.

The specification and examples provided above should be considered exemplary only. It is contemplated that the appended claims will cover any other such embodiments or modifications as fall within the true scope of the invention.

What is claimed is:

1. A system for error detection for detecting errors in data transmitted between a server and a client, the system comprising:
    an interface means to a client;
    a server configured with a pre-processing means and a post-processing means which operate together to detect whether a parameter value sent from the server to the client and subsequently returned to the server from the client has been tampered with, wherein the pre-processing means and post-processing means further comprise a hashing means that operates on a parameter value and on a received parameter value;
    a transmitted data string transmitted to the client comprising the parameter value and the hash of the parameter value;
    a received data string received from the client comprising the received parameter value and hash of the parameter value;
    a communication link connecting the server to the client; and
    a comparison means,
    wherein the post-processing means operates on the received parameter value to determine the hash of the received parameter value, wherein further the comparison means compares the hash of the parameter value to the hash of the received parameter value to determine if the parameter value transmitted to the client is the same as the received parameter value received from the client, wherein further an unfavorable comparison of the hash of the parameter value and the hash of the received parameter value indicates that the parameter value was tampered with after the transmitted data string was transmitted to the client.

2. The system of claim 1, wherein the pre-processing means comprises use of a session identification number.

3. The system of claim 1, wherein the pre-processing means comprises date and time stamping.

4. The system of claim 1, wherein the pre-processing means comprises encryption.

5. The system of claim 4, wherein the encryption comprises use of a private server key.

6. The system of claim 1, wherein the post-processing means comprises decryption.

7. The system of claim 6, wherein the decryption comprises use of a private server key.

8. The system of claim 1, wherein the hashing means comprises operation on a session identification number.

9. The system of claim 1, wherein the hashing means comprises operation on a date and time stamp.

10. A method for error detection for detecting errors in data transmitted between a server and a client, the method comprising:
    a) pre-processing at a server, comprising a first hash of at least one parameter value, the parameter value corresponding to a parameter;
    b) formatting a data string containing at least one parameter value and the first hash of the at least one parameter value;
    c) transmitting the formatted data string from the server to a client;
    d) receiving a modified data string from the client at the server, the modified data string comprising a received parameter value and the first hash of the at least one parameter value, the received parameter value corresponding to the parameter;
    e) post-processing at the server, comprising a second hash of the received parameter value in the modified data string; and
    f) comparing the first hash of the at least one parameter value to the second hash of the received parameter value, whereby an unfavorable comparison of the first hash of the at least one parameter value to the second hash of the received parameter value indicates that parameter values corresponding to at least one parameter that originated at the server were sent to the client, and were received back at the server from the client in a changed condition.

11. The method of claim 10, wherein the step a) of pre-processing comprises the use of a session identification number.

12. The method of claim 11, wherein the use of a session identification number comprises hashing.

13. The method of claim 10, wherein the step a) of pre-processing comprises the use of time-stamping.

14. The method of claim 13, wherein the use of time-stamping comprises hashing.

15. The method of claim 10, wherein the step a) of pre-processing comprises encryption.

16. The method of claim 15, wherein the encryption uses a private server key.

17. The method of claim 10, wherein the step b) of formatting comprises appending the data string containing at least one parameter value with a session identification number.

18. The method of claim 11, wherein the step b) of formatting comprises appending the data string containing at least one parameter value with a date and time stamp.

19. The method of claim 11, wherein the step b) of formatting comprises appending the data string containing at least one parameter value with at least one hash.

20. The method of claim 10, wherein the step c) of transmitting comprises embedding at least one parameter value in a uniform resource locator.

21. The method of claim 10, wherein the step c) of transmitting comprises embedding at least one parameter value in a cookie.

22. The method of claim 10, wherein the step e) of post-processing comprises decryption.

23. The method of claim 22, wherein the decryption comprises use of a private server key.

24. The method of claim 10, wherein the step e) of post-processing comprises a comparison of the first and second hashes for at least one parameter value of interest.

25. A system for error detection for detecting errors in data transmitted between a server and a client, the system comprising:
    an interface with a client;
    a server configured with a pre-processing unit and a post-processing unit which operate together to detect whether a parameter value transmitted from the server to the client and subsequently returned to the server has been tampered with, wherein the pre-processing unit and post-processing units further comprise a transformation unit that operates on the parameter value and a received parameter value using a secret;
    a transmitted data string transmitted to the client comprising the parameter value and a transformation of the parameter value;
    a received data string received from the client comprising the received parameter value and the transformation of the parameter value;
    a communication link connecting the server to the client; and
    a comparison unit,
    wherein the post-processing unit operates on the received parameter value to determine the transformation of the received parameter value, wherein further the comparison unit compares the transformation of the parameter value to the transformation of the received parameter value to determine if the parameter value transmitted to the client is the same as the received parameter value received from the client, wherein further an unfavorable comparison of the transformation of the parameter value and the transformation of the received parameter value indicates that the parameter value was tampered with after the transmitted data string was transmitted to the client.

26. The system of claim 25, wherein the transformation unit comprises a hashing unit.

27. The system of claim 25, wherein the transformation unit comprises an encrypting unit.

28. A method for error detection for detecting errors in data transmitted between a server and a client, the method comprising:

a) pre-processing at a server, comprising a transformation of a parameter value in a data string using a secret, the parameter value corresponding to a parameter, the data string comprising the parameter value and the transformed parameter value;
b) transmitting the data string from the server to a client;
c) receiving a modified data string from the client at the server, the modified data string comprising a received parameter value and the transformed parameter value;
d) post-processing at the server, comprising a transformation of the received parameter value in the modified data string using the secret; and
e) comparing the transformed parameter value to the transformed received parameter value to detect whether the parameter value that originated at the server and was sent to a client was received back at the server from the client in a changed condition.

29. The method of claim 28, wherein the transformation comprises hashing.

30. The method of claim 28, wherein the transformation comprises encryption.

31. A system for error detection for detecting errors in data transmitted between a server and a client, the system comprising:
    a communications link between a server and at least one client;
    a pre-processing unit connected to the server;
    a post-processing unit connected to the server;
    a comparison unit connected to the server, the pre-processing unit and the post-processing unit;
    a broadcast data string comprising a first parameter value corresponding to a parameter, and a transformed first parameter value corresponding to the first parameter value; and
    a return data string comprising the transformed first parameter value and a second parameter value corresponding to the same parameter,
    wherein the broadcast data string is communicated from the server to at least one client and the return data string is returned to the server in a subsequent communication from the client to the server;
    wherein the pre-processing unit transforms the first parameter value in the broadcast data string using a secret to provide the transformed first parameter value,
    wherein further the post-processing unit transforms the second parameter value in the return data string using the same secret to provide a transformed second parameter value;
    wherein further the transformed first parameter value and the transformed second parameter value are compared by the comparison unit to determine if the first parameter value in the broadcast data string is the same as the second parameter value in the return data siring.

32. The system of claim 31, wherein the transformation comprises hashing.

33. The system of claim 31, wherein the transformation comprises encryption.

34. The system of claim 31, wherein the secret is maintained in the server.

35. The system of claim 31, wherein the parameter comprises a price for a good or service.

* * * * *